Patented Aug. 6, 1935

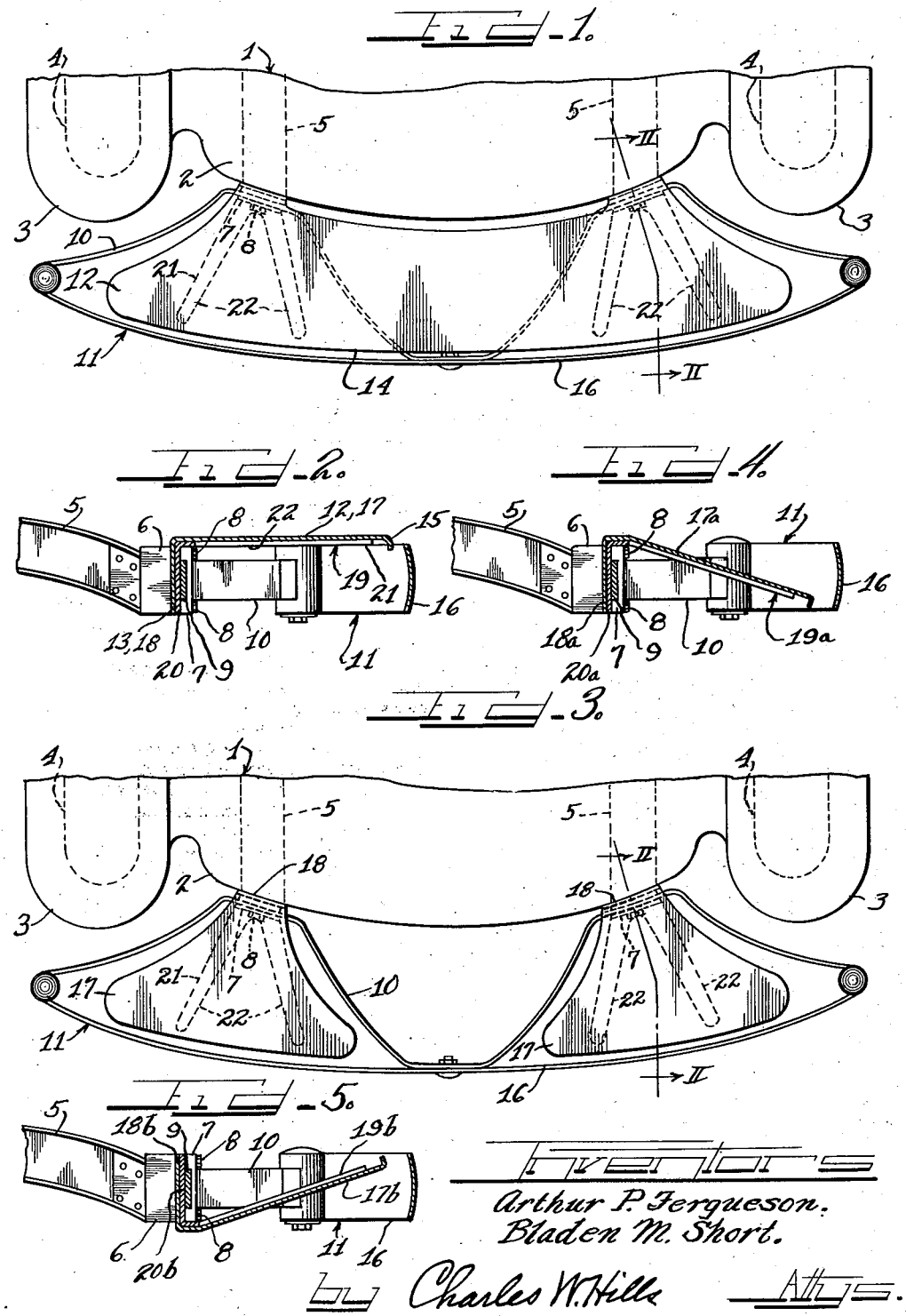

2,010,071

UNITED STATES PATENT OFFICE 2,010,071

BACK BAR SHIELD

Arthur P. Fergueson and Bladen M. Short, Detroit, Mich., assignors to General Spring Bumper Corporation, Detroit, Mich., a corporation of Michigan Application February 10, 1933, Serial No. 656,060

13 Claims. (Cl. 293—55)

This invention has to do with gravel deflectors, particularly of the character employed in conjunction with a motor vehicle such as the rear thereof for preventing gravel and the like thrown up by the tires during motion of the vehicle from striking the finish of the adjacent portions of the body of the vehicle.

The invention also relates to back bar shields, and it is an object of the invention to eliminate a heretofore unsightly part of the bumper by providing means for shielding or concealing a substantial portion of the back bar of the bumper.

It is a further object to provide a device for shielding the back bar of a bumper and also for protecting the finish of the body of the car from injury by gravel and the like thrown up by the vehicle wheels.

It is an object of the invention to provide a means which will not require any reorganization whatsoever of existing vehicle body and bumper constructions and which nevertheless may be readily attached in such position as to effectively prevent gravel and the like thrown up by the rear wheels of the vehicle striking and marring the finish of the fenders, intermediate body portions and any spare tire and/or tire cover that may be mounted at the rear of vehicle.

It is a further object of the invention to provide a gravel deflector of simple construction embodying a minimum of parts and arranged to be secured to a motor vehicle by the same means employed in securing the bumper or bumpers to the car.

It is a further object of the invention to provide gravel deflector construction which may be shaped to conform with any desired esthetic scheme and yet function as intended, and which may be formed in a plurality of parts or in a single part, as desired.

It is a further object of the invention to provide a gravel deflector construction for use in conjunction with a bumper of a motor vehicle, with the deflector extending either in a horizontal plane or a plane inclined to the horizontal, as desired.

It is a still further object of the invention to provide a gravel deflector construction which is as well applicable to bumperettes as to a single complete bumper.

It is another object of the invention to provide a gravel deflector which is attached to a car body independently of the bumper in conjunction with which the deflector is used.

In carrying the invention into practice, in accordance with one form of the invention, the deflector is formed as a single stamping or plate arranged to extend between the impact bar and the body of the vehicle at the rear thereof, preferably, and to extend, when so made, substantially between the planes of the rear tires. The plate is formed with a pair of angularly offset attaching arms which are positioned against the rear portions of the frame between the fenders. A reinforcing device of angular form is arranged with one portion adjacent the deflecting portion of the plate for reinforcing the same, the other angularly disposed part of the reinforcing member being positioned against the corresponding offset portion of the deflector plate. The supporting back bar of the bumper is positioned against the attaching part of the reinforcing member, and all three parts are bolted to the rear of the vehicle, or the deflector plate and reinforcing member attaching portions can be spotwelded or otherwise welded to the vehicle and then the bumper back bar bolted on at the same place.

In accordance with another form of the invention, the deflector plate construction may comprise spaced individual deflectors, one arranged adjacent each fender or each end of the bumper, or each deflector member can be used in conjunction with a bumperette.

It is further contemplated that the deflecting portion of the deflector may extend horizontally or be inclined to the horizontal.

With this construction, gravel and the like thrown upwardly by the rear wheels and deflected by the impact bar forwardly in the direction of the vehicle body is caught by the rearwardly deflecting extending portion of the deflector plate and thereby prevented from striking the finish of the vehicle body and such devices as spare tires and tire covers as may be attached to the rear of the car.

Further objects and advantages of the invention will appear as the description proceeds.

This invention (in preferred forms) is illustrated in the drawing and hereinafter more fully described.

Figure 1 is a fragmentary plan view of the rear portion of a vehicle body showing the invention applied thereto.

Figure 2 is a somewhat enlarged fragmentary view, partly in section and partly in elevation, taken substantially in the plane designated by the line II—II in Figures 1 and 3.

Figure 3 is a view similar to Figure 1 but showing a modified form of the invention comprising a pair of deflectors.

Figures 4 and 5 are views similar to Figure 2 but showing further modified forms of the invention.

Referring now more particularly to the drawing, the rear of the vehicle body is shown fragmentarily at 1, including the body proper 2 and rear fenders 3 concealing the rear wheel tires as shown in dotted lines at 4. The chassis frame horns 5 extending at the rear of the car are arranged with mounting blocks 6 formed as a means by which the supporting bar of a bumper may be secured firmly in position. The bumper attaching means also includes a clamp member 7 supplied with bolts 8 and formed with a cut-out 9 of a shape conforming to the cross sectional shape of the supporting bar 10 of the bumper 11. Thus in the conventional car embodying simply a rear bumper, the bumper is attached directly to the mounting blocks 6 of the frame horns 5 by means of the clamp member 7 and associated bolts 8 or the like.

In the practice of the present invention, it is not necessary to in any way change or modify existing bumper constructions or the means by which the bumpers are attached to the chassis. In accordance with one form of the invention, the gravel deflecting construction is shown in Figures 1 and 2 as comprising a plate-like stamping 12 which may conform generally to the outline of the bumper 11 as shown and may be arranged horizontally to substantially overlie the bumper. The plate 12 is preferably provided in juxtaposition to the rear ends of the chassis frame horns 5 with downwardly extending attaching arms 13, so that when the deflector device is in operative position as shown, said portions 13 are positioned against the mounting blocks 6. For the purpose of rigidity, the rear edge portion 14 of the plate 12 is formed with a flange 15 which is spaced from the impact bar 16 sufficiently to obviate any likelihood of its interference with the flexing of the impact bar in the function of the same when it receives a bump.

The deflector plate 12 may extend to substantially the planes of the rear tires 4, or if desired the plate 12 may be disposed entirely within the space between the planes of the tires 4.

The deflector plate construction may involve a single piece as shown in Figure 1, or a plurality of pieces as shown at 17 in Figure 3. The plates 17 may also be arranged so that their outermost portions extend substantially to the planes of the rear tires 4, or as explained above may be disposed entirely within the space between the planes of the tires 4. The plates 17 are arranged to receive the gravel and the like that is thrown upwardly by the tires directly from the tires, and may be arranged as shown in Figures 2 and 5 to serve as a baffle to also prevent stones which strike the bumper impact bar 16 from being deflected onto the adjacent rear surface of the body of the car. In Figure 4, it is clear that the arrangement of the plate is such as to substantially prevent gravel and the like striking the impact bar 16, the deflector plate serving as the entire object deflecting means for the gravel.

It will be observed that the duplex deflector construction shown in Figure 3 as well as the single plate construction of Figure 1 substantially follows the outline of the impact bar 16 and thus carries out the scheme of the rear of the car from the standpoint of appearance. It will be noted that the clearance between the plates 17 and the impact bar 16 is sufficient to enable the impact bar 16 to flex without obstruction from the plates 17. It will be understood, moreover, that the individual plates 17 of Figure 3 are directly applicable for use in connection with bumperettes instead of a complete bumper.

The single piece deflector 12, if desired, could be mounted in reverse arrangement to that shown in Figures 1 and 2, namely, with the plate portion 12 lowermost. It will be appreciated, of course, that the plate arrangement may be varied as desired; and in the event a bumper of different construction and arrangement from that shown is employed, obviously the construction and arrangement of the deflector or baffle plate could similarly be varied without departing from the principles of the invention.

From the foregoing, it is clear that the deflector construction is extremely simple and may be arranged to lie entirely in the space between the planes of the rear tires, is mounted independently of the bumper at the rear of the car, and functions independently of the bumper and is completely effective to prevent the gravel and the like from reaching the polished or painted surface of the rear portion of the body of the car, at the same time not interfering in any way with the flexing of the bumper.

With a view to reinforcing the deflector or baffle plate, suitable brackets 19 are provided. The brackets may assume any desired shape and arrangement, and are shown herein for illustrative purposes only as comprising substantially angular members arranged to nest in the deflector plate devices 12 and 17. The leg 20 of each bracket 19 fits between the securing block 7 and the leg 13, 18 of the associated deflector member 12, 17 and is secured by the bolt means 8. The other leg 21 of each bracket 19 extends rearwardly and is preferably formed with a plurality of divergent arms 22 which engage and assist in supporting the cantilever plates 12 and 17.

The bracket devices 19$^a$ and 19$^b$ including arms 20$^a$ and 20$^b$ for use in conjunction with the forms of the invention appearing in Figures 4 and 5, respectively, are preferably identical with each other, and are formed to nest in the respective deflector plate devices 17$^a$ and 17$^b$.

Perhaps the majority of bumpers have their impact bars disposed in longitudinally arcuate vertical surfaces, that is, with the end portions of the impact bars curved toward the wheels generally as shown in Figures 1 and 3. Thus the stones and the like thrown back by the wheels and striking the adjacent forward surfaces of the impact bar are reflected substantially at an angle to the vertical and generally toward the portion of the vehicle body between the fenders. It is accordingly preferable that the deflector plate be arranged to baffle the gravel so deflected as shown in Figures 1 and 3, the deflector plates being located in the range of the gravel thus deflected to protect the finish of the rear part of the vehicle body.

It will be appreciated that stones and the like are also thrown up by the front wheels and, due to their camber and the speed of the car, are in full flight when the rear wheels have advanced as far as the gravel, and strike the rear bumper. Such gravel, due to its spread because of the time elapsing before striking the rear bumper, for the most part strikes the bumper inwardly of the rear wheels and closer to the center of the bumper. To prevent such gravel impinging on the vehicle body at the rear, the deflector has portions arranged the entire width from fender to fender as shown in Figure 1 and a substantial distance toward the center of the bumper as shown in Figure 3.

The individual deflectors 17 may, if desired, be made identical in shape so that they may be used interchangeably and thus reduce the cost of manufacture.

The deflector and reinforcing bracket devices are preferably metal stampings of substantially rigid character but preferably capable of flexing sufficiently to obviate breakage due to impacts or other stresses to which the same may be subjected in use. The mounting blocks 6 and 7 and associated parts are also preferably of metal, although any other suitable material may be employed.

It is evident from the foregoing that the deflectors are mounted on or secured to the frame independently of the bumper, although the same bolts are conveniently used to secure the bumper support bar also. It is well within the province of the invention, if desired, to spot weld or otherwise weld or rivet the deflector device to the frame and mount the bumper support bar as shown herein or in any other suitable way not affecting the mounting of the deflector device.

The horizontal deflector plates are preferably arranged at or below the plane of the adjacent rear part of the vehicle body to avoid the possibility of pebbles and the like rebounding from said plates from striking any part of the body. The inclined plates are arranged so that pebbles and the like rebounding therefrom will not strike the body, and they may be arranged bodily above or below or otherwise relative to the bottom of the adjacent part of the body.

We are aware that many changes may be made and numerous details of construction may be varied through a wide range without departing from the principles of this invention, and we therefore do not purpose limiting the patent granted hereon otherwise than necessitated by the prior art.

We claim as our invention:

1. In a motor vehicle including wheels, a rear frame construction and a rear bumper: means secured to the rear frame construction and constituting a baffle to prevent gravel thrown up by the wheels from being deflected by the bumper onto the outer finish of the body of the vehicle, said means being supported by said frame construction as a cantilever extending rearwardly from the frame construction and means for reinforcing the portion of the first means thus extending from the frame construction.

2. In a motor vehicle having a rear frame and body construction and including a rear bumper together with wheels, means for preventing gravel and the like thrown up by the tires on the vehicle wheels and deflected by the bumper from striking the outer finish of the body, and instrumentalities for securing said means to the frame, said means having portions extending transversely of the vehicle throughout major portions of the distances between the central longitudinal plane of the vehicle and the central longitudinal planes of the rear wheels.

3. In a motor vehicle having wheels and a rear frame and body and an associated rear bumper, means for preventing marring of the outer surface of the body by gravel and the like thrown up by the tires on the vehicle wheels and deflected by the bumper, said means comprising a baffle plate secured to the frame independently of the bumper and extending rearwardly from and substantially coextensive with the body transversely thereof.

4. In a motor vehicle including wheels, a rear body and frame construction and a rear bumper, means secured to the rear frame construction and constituting a baffle of plate-like structure supported by said frame construction as a cantilever arranged between the body and the bumper to protect the outer finish of the body of the vehicle from gravel thrown up by the tires on the wheels and deflected by the bumper, said plate structure extending rearwardly from the frame construction and over a substantial portion of the support bar of the bumper to conceal said portion from above.

5. In a motor vehicle including wheels and a body and having a bumper comprising an impact member and back bar means for supporting said member, a shield overlying a major portion of the back bar, means so as to conceal the same, said shield extending rearwardly from the lower part of the vehicle body and between the body and the impact member to protect the adjacent portion of the outer finish of the body from injury by pebbles and the like thrown up by the tires on the vehicle wheels and deflected by the impact member.

6. In a motor vehicle including wheels, a rear frame construction and a rear bumper: means secured to the rear frame construction and constituting a baffle to prevent gravel thrown up by the wheels from being deflected by the bumper onto the outer finish of the body of the vehicle, said means being supported by said frame construction as a cantilever extending rearwardly from the frame construction and means for reinforcing the portion of the first means thus extending from the frame construction, said reinforcing means comprising a yoke whose arms underlie and engage the baffle.

7. In a motor vehicle including wheels, a body, a rear frame construction and a rear bumper, means secured to the rear frame construction and constituting a baffle of plate-like structure supported by said frame construction as a cantilever arranged to protect the outer finish of the body of the vehicle from gravel thrown up by the tires on the wheels and deflected by the bumper, said plate structure extending rearwardly from the frame construction and concealing a substantial portion of the support bar of the bumper from above.

8. In a motor vehicle including wheels, a frame, a rear bumper having impact and support bars, a clamp piece, the support bar being disposed between the frame and the clamp piece, and means passing free of the support bar above and below the same for securing the same to the frame: a plate arranged between the impact bar and the lower margin of the vehicle body to protect the outer finish of the latter from pebbles and the like thrown up by the tires and deflected toward the finish by the impact bar, said plate having an angularly offset anchor disposed between the support bar and the frame, said securing means passing through said anchor for mounting said plate on the frame.

9. In a motor vehicle including wheels, a frame, a rear bumper having impact and support bars, a clamp piece, the support bar being disposed between the frame and the clamp piece, and means passing free of the support bar above and below the same for securing the same to the frame: a plate arranged between the impact bar and the lower margin of the vehicle body to protect the outer finish of the latter from pebbles and the like thrown up by the tires and deflected toward the finish by the impact bar, said plate having an angularly offset anchor disposed between the support bar and the frame, said securing means passing through said anchor for mounting said plate on the frame, said anchor being disposed at a margin of the plate, the remainder of the plate extending free as a cantilever.

10. In a motor vehicle including wheels, a frame, a rear bumper having impact and support bars, a clamp piece, the support bar being disposed between the frame and the clamp piece, and means passing free of the support bar above and below the same for securing the same to the frame; a plate arranged between the impact bar and the lower margin of the vehicle body to protect the outer finish of the latter from pebbles and the like thrown up by the tires and deflected toward the finish by the impact bar, said plate having an angularly offset anchor disposed between the support bar and the frame, said securing means passing through said anchor for mounting said plate on the frame, and a reinforcing yoke whose arms underlie and engage said plate, said yoke having an angularly offset stem through which said securing means pass.

11. In an automobile having wheels and a rear frame and body and an associated rear bumper: means for preventing injury to the outer surface of the body by gravel and the like thrown up by the tires against the bumper and deflected thereby onto said surface, said means comprising a baffle plate arranged to intercept such gravel and the like so as to prevent its reaching the body, said plate being secured to the rear frame and extending rearwardly from and substantially coextensive with the lower rear margin of the body transversely thereof.

12. In motor vehicle construction embodying wheels and a rear bumper having impact portions disposed rearwardly and substantially in the planes of the rear wheels of the vehicle: shield means spaced from and mounted independently of said portions and arranged in the path of movement of objects thrown up by the wheels toward the bumper, whereby the bumper may be free to flex and the finish of the vehicle body is protected from injury from such objects which would otherwise rebound from the impact portions onto said finish.

13. In a motor vehicle construction embodying a bumper having impact and back bars, means for concealing a major part of the back bar, said means being located between the vehicle body and the impact bar and including a portion extending toward the impact bar from the body, said portion being arranged substantially between the planes of the upper and lower limits of the impact bar, whereby said impact bar serves to protect said portion from injury from colliding bumpers and other objects, and reinforcing means engaging the body of said portion for resisting deformation of the same.

ARTHUR P. FERGUESON.
BLADEN M. SHORT.

CERTIFICATE OF CORRECTION.

Patent No. 2,010,071. August 6, 1935.

ARTHUR P. FERGUESON, ET AL.

It is hereby certified that error appears in the printed specification of the above numbered patent requiring correction as follows: Page 3, second column, line 20, claim 5, after "bar" strike out the comma; and that the said Letters Patent should be read with this correction therein that the same may conform to the record of the case in the Patent Office.

Signed and sealed this 24th day of September, A. D. 1935.

Leslie Frazer (Seal) Acting Commissioner of Patents.